June 24, 1952   J. R. SNYDER   2,601,339
DRUM CAP AND SPIGOT VALVE ASSEMBLY
Filed March 1, 1948   2 SHEETS—SHEET 1
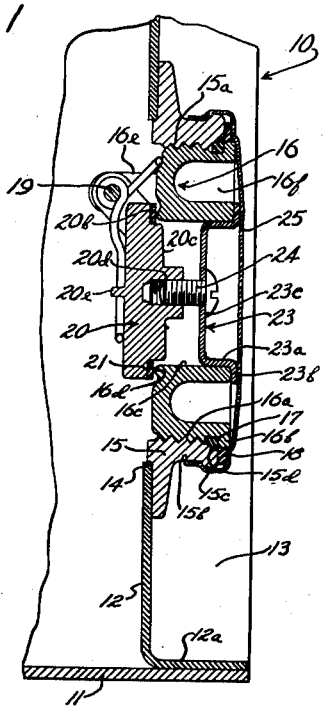
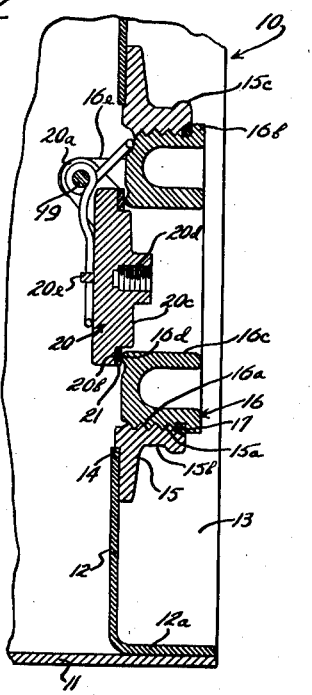
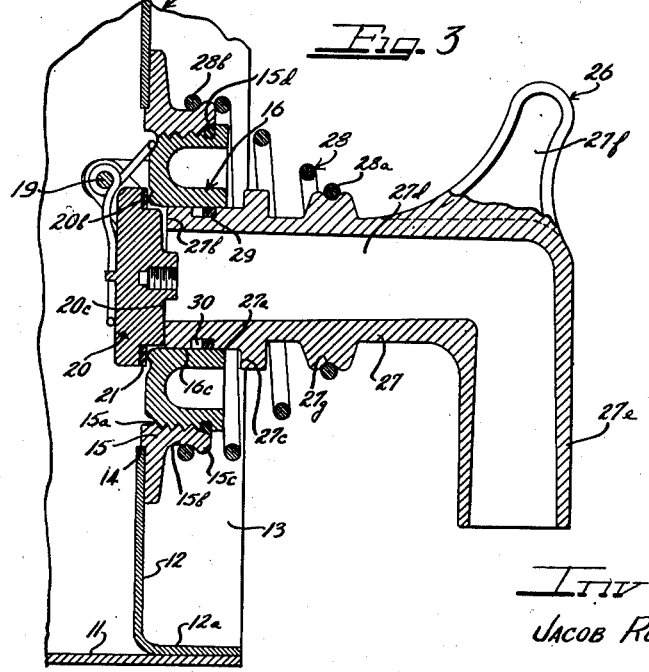
Inventor
JACOB RUSH SNYDER
by The Firm of Charles W. Hills Attys.

June 24, 1952          J. R. SNYDER          2,601,339
DRUM CAP AND SPIGOT VALVE ASSEMBLY
Filed March 1, 1948          2 SHEETS—SHEET 2
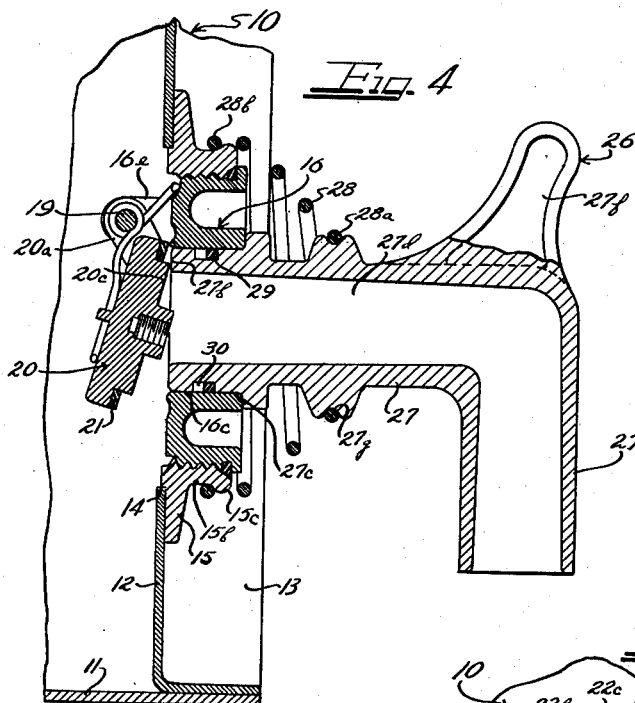
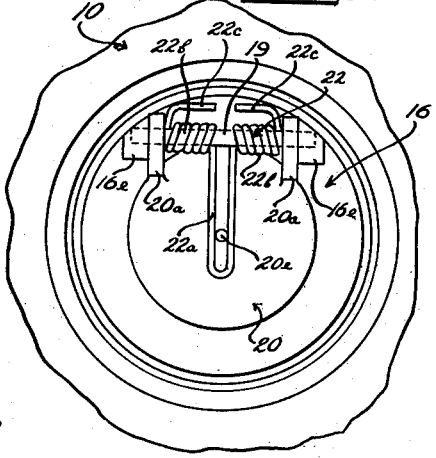
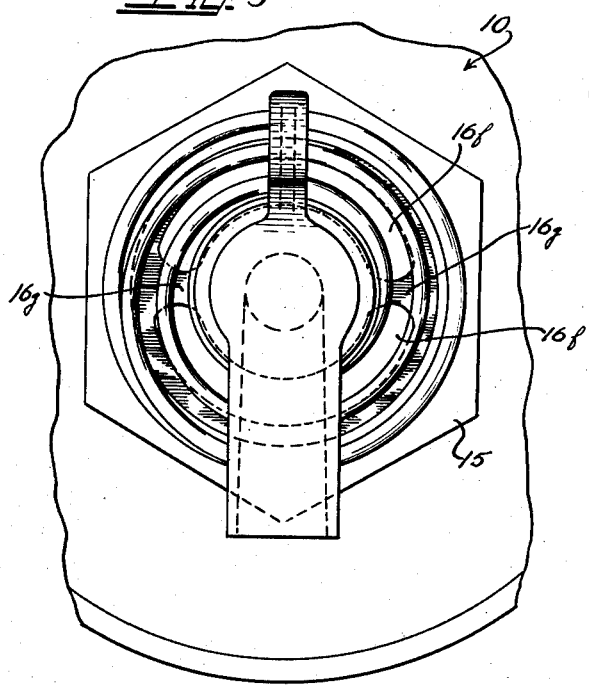
Inventor
JACOB RUSH SNYDER
by The Firm of Charles W. Hills Attys.

Patented June 24, 1952

2,601,339

UNITED STATES PATENT OFFICE 2,601,339

DRUM CAP AND SPIGOT VALVE ASSEMBLY

Jacob Rush Snyder, Cleveland, Ohio, assignor to Thompson Products, Inc., Cleveland, Ohio, a corporation of Ohio Application March 1, 1948, Serial No. 12,402

9 Claims. (Cl. 137—69)

This invention relates to a self-closing assembly for selective drainage of drums, barrels, and the like containers.

Specifically, this invention relates to a closure valve-equipped assembly for a bung bushing which includes a selectively detachable spigot for automatically opening the valve at a rapid rate whenever it is depressed and for effecting a quick sealing of the bushing whenever the spigot is released.

According to this invention, a container, such as a drum or barrel, equipped with an internally threaded bung bushing, receives an externally threaded ring with an outturned flange at one end and a valve seat at the other end. A spring-loaded valve is mounted on the ring and coacts with the seat to close the passage through the ring. The outturned flange is adapted to be bottomed on a gasket between the bushing and the flange. This flange has a smaller diameter than the bushing. The valve can be locked in closed position by a screw which is carried by a recessed cap fitting into the passage of the ring and bottomed on the outer face of the ring. A hermetically sealed outer cap can conveniently overlie the ring and be locked on the beaded lip of the bung bushing. The recessed inner locking cap will protect the passage-defining wall of the ring when prying off the outer cap with a sharp tool or the like. A sealing ring or gasket conveniently surrounds the flange of the ring to coact with the cap and the bushing for forming the hermetic seal. When the sealing cap and the locking cap are removed, the valve of the assembly is easily opened by a detachable spigot which slides in the passage of the ring to engage the valve. A coil spring carried by the detachable spigot can have the free end coil thereof detachably anchored on the beaded lip of the bushing. The coil spring normally holds the spigot in the passage of the ring. When the spigot is depressed further into the passage, its end face acts on the valve to swing the valve away from its seat thereby permitting drainage of the contents of the drum or other container through the spigot.

A feature of the invention resides in the detachable spigot for use with any cap assembly of this invention upon mere insertion of the end of the spigot into the ring of the assembly and snapping the free end coil of the spring onto the bung bushing.

It is, then, an object of the invention to provide a cap and spigot assembly for containers such as drums, barrels, and the like, wherein a closure valve-equipped ring adapted to be readily connected to the bung bushing of the container has a drain passage for slidably supporting a detachable drain spigot and wherein the closure valve is quickly manipulated to opened position by sliding the spigot in the passage.

Another object of the invention is to provide a closure cap and drain spigot arrangement for the bung bosses of barrels, drums, and other containers wherein a drain ring is equipped with a spring-loaded closure valve and slidably supports a hollow spigot for coacting with the valve to selectively open the container for drainage through the spigot.

A still further object of the invention is to provide an end cap assembly for barrels, drums, and the like wherein the bung bushing of the assembly carries a closure valve-equipped drain ring that does not interfere with the hermetic sealing of the bushing.

A still further object of the invention is to provide a device for rapidly withdrawing fluids from containers such as drums or barrels which will not interfere with sealing of the container when in transit or storage regardless of temperature changes and rough handling conditions.

A further object of the invention is to provide a spigot stabilizer in the form of a spring which, when depressed, will permit the spigot to open a drain valve, and, when unloaded, will hold the spigot in assembled relation in a drain ring.

Other and further objects of the invention will be apparent to those skilled in the art from the following detailed description of the annexed sheets of drawings, which, by way of a preferred example only, illustrate one embodiment of the invention.

On the drawings:

Figure 1 is a fragmentary cross-sectional view of the end head of a metal drum equipped with a cap assembly according to this invention and illustrating the condition of the assembly when hermetically sealed and locked as in transit or storage.

Figure 2 is a view similar to Figure 1 but illustrating the condition of the cap assembly for receiving a drain spigot to selectively open the drum.

Figure 3 is a view similar to Figure 2 but illustrating the drain spigot in position.

Figure 4 is a view similar to Figure 3 but illustrating the depressed position of the drain spigot and the opened position of the closure valve.

Figure 5 is a front end elevational view of the assembly of Figures 3 and 4.

Figure 6 is an end elevational view of the inner end of the assembly and showing the closure valve and valve mounting arrangement.

As shown on the drawings:

In Figures 1 to 4 inclusive the reference numeral 10 designates generally a steel drum of the type including a cylindrical side wall or shell 11 receiving an end head 12 in one end thereof. The end head 12 has an outturned peripheral flange or skirt 12a welded or otherwise secured to the shell. The drum end head 12 is therefore inwardly from the end of the drum and a recess 13 is provided on the end of the drum.

The drum head 12 has an opening 14 therein and a bung bushing 15 is attached to the end head 12 around this opening 14. The bung bushing 15 has internal threads 15a and an external cylindrical neck 15b terminating in a bead 15c. The mouth of the bushing is chamfered or beveled at 15d so that the threads 15a do not extend to the end of the bushing.

A metal ring 16 has external threads 16a in threaded engagement with the threads 15a of the bushing 15. An outturned flange 16b on the ring 16 overlies the beveled mouth 15d of the bushing and coacts with a sealing gasket 17 to compress the gasket into sealing relationship between the bushing and ring. The periphery of this flange 16b terminates radially inward from the periphery of the beaded end 15c of the bushing, so that a sealing gasket 18 can be bottomed on the bushing 15 around the flange of the ring.

The ring 16 has a central passage 16c therethrough with a seating face 16d surrounding the inner end of this passage. This seating face 16d is preferably rounded as shown.

As best shown in Figure 6, a pair of lugs 16e project from the inner face of the ring 16 in spaced opposed relation to receive the ends of a pin 19.

A closure valve 20, in the form of a metal disk, is provided for coacting with the seat 16d to close the drain passage 16c of the ring 16. This valve 20 has a pair of ears or lugs 20a thereon receiving the pin 19 therethrough for swingably mounting the valve on the ring.

As shown in Figures 1 to 3, the valve 20 has a shoulder 20b receiving a sealing ring 21 thereon. This ring is preferably composed of resilient material, such as rubber, rubber substitutes, or the like, and coacts with the seat 16d of the ring 16 to seal the passageway 16c.

In the closed position of the valve 20, with the ring 21 seated on the seat 16d, a front face 20c is disposed in the passageway 16c. This front face is tapered so that the portion most remote from the supporting pin 19 projects farther into the passage than the portion adjacent the pin, for a purpose to be more fully hereinafter described. The central part of the face 20c has an upstanding internally threaded boss 20d thereon.

The back face of the valve 20 has a central lug 20e thereon straddled by a bifurcated spring finger 22a of a torsion spring 22 having coils 22b disposed around the pin 19 and free ends 22c bottomed on the inner face of the ring 16. This torsion spring 22 urges the valve 20 to the closed position of Figures 1 to 3.

The torsion spring 22 loads the valve 20 sufficiently to maintain a good sealing engagement between the ring 21 and the seat 16d. However, as a precautionary safety first feature of this invention, the valve 20 can be locked in sealed position during transit or storage of the drum 10 thereby defeating any possibility of rough handling, differential pressure conditions inside and outside of the drum, and the like extreme conditions from affecting the seals. This lock is produced by means of an inexpensive stamped metal cap 23 and a screw 24 shown in Figure 1. Both of these members can be discarded after the drum is opened. The cap 23 has a side wall 23a fitting into the passage 16c of the ring 16 together with an outturned flange 23b overlying the outer end face of the ring adjacent the passage. The main depressed wall 23c of the cap 23 spans the passage 16c and is apertured to receive the screw 24. The screw 24 is threaded into the boss 20d of the valve 20 and, when tightened, will lock the ring 21 against its seat 16d.

A sealing cap 25, shown in Figure 1, overlies the cap 23, ring 16, gasket 18, and surrounds the neck 15b of the bushing 15 to be retained on the bushing by the bead 15c. The cap 25 coacts with the gasket 18 to form a hermetic seal for the assembly.

The ring 16 has a pair of wrench-receiving recesses 16f in its outer face separated by lugs 16g as best shown in Figure 5. These recesses are adapted to receive a spanner wrench which will engage the lugs 16g to tighten the ring in the bushing 15. The recesses are also protected by the cap 25.

When it is desired to open up the sealed drum shown in Figure 1, the cap 25 is pried off of the assembly while the inner locking cap 23 protects the wall of the passage 16c against damage by the prying tool. This wall of the passage 16c should be free from scratches, nicks, and the like rough surfaces which might damage or interfere with the sealing efficiency of the hereinafter described seal ring on the spigot. When the cap 25 is removed, the screw 24 in the cap 23 is removed from the valve 20 and the cap 23. The cap 25, the screw 24, and the cap 23 can then be discarded, because the valve 20 will maintain the drum in closed condition. The beveled end 15d of the bushing 15 and the inserted sealing ring or gasket 17 will protect the threads 15a and 16a against damage by any tool used in prying the cap off of the assembly. It will be noted that the entire assembly including the cap 25 lies entirely within the recess 13 in the end head of the drum, so that the drum can stand upright or be stacked with other similar drums without damaging the assembly. After removal of the caps 23 and 25, the passage 16c of the ring 16 is accessible and the beveled inner face 20c of the valve 20 blocks the inner end of this passage.

As shown in Figure 3, a drain spigot assembly 26 is provided for opening the valve 20 and for controlling drainage out of the drum. This spigot assembly includes a die-cast body 27, a conical type coil spring 28, and an O ring seal 29. The body 27 has an end 27a sized for fitting in the passage 16c. A groove 30 is provided in this end 27a to receive the O ring 29. As is conventional, the groove 30 is wider than the O ring 29. The end face 27b of the portion 27a is adapted to engage the tapered face 20c of the valve 20. Initial contact between this end face 27a and the valve face 20c is established, as shown in Figure 3, at the point of the face 20c which projects the greatest distance into the passage 16 and, as explained above, is remote from the pivot-supporting pin 19. A shoulder 27c is provided at the end of the portion 27a to be bottomed on the ring 16 for limiting the extent of insertion of the portion 27a into the passage 16c. As illustrated in Figure 4, when this shoulder contacts the ring 16, the face 27b engages the face 20c of the valve 20 adjacent the pivot support for the valve, thereby increasing the speed of opening of the valve. Thus, the initial contact, being at the point most remote from the pivot support 19, is effective to obtain the most leverage on the valve for cracking it off of its seat, and continued opening movement of the valve is then effected by shifting the contact between the valve and spigot closer to the pivotal support for the valve thus decreasing the leverage but increasing the speed of opening of the valve. This arrangement makes possible a full desired opening of the valve without requiring a long stroke for the spigot.

The body 27 of the spigot assembly 26 has an angled passage 27d extending outwardly from the end face 27b through a downwardly extending discharge spout portion 27e. A convenient operating handle 27f is provided above the spout 27e.

The body 27 has a recess 27g therearound between the shoulder 27c and the handle 27f for receiving the small end coil 28a of the conical spring 28. The large end coil 28b of this spring 28 is disposed around the neck 15b of the bushing 15 and is retained thereon by the bead 15c. This coil spring, with the end coils seated in the recess 27g and behind the bead 15c will hold the spigot as shown in Figure 3 with the end 27a in the passage 16 but with the valve 20 in fully closed position. The spring will resist movement of the spigot out of the passage 16c because tensioning forces will be necessary to expand the spring beyond the free height thereof shown in Figure 3.

When the spigot is depressed further into the ring from the position shown in Figure 3 to the position shown in Figure 4, the spring 28 is compressed and the torsion spring 22 acting on the valve 20 is tightened. These two springs thereupon cooperate to return the spigot back to the position of Figure 3 while, of course, the spring 22 returns the valve from its opened to its closed position.

The spigot is quickly assembled and disassembled in the ring 16 by mere insertion of the end 27a into the ring passage 16c and by snapping the end coil 28b of the spring 28 over the bead 15c.

From the above descriptions it will be understood that this invention provides a self-closing cap assembly for drums, barrels, and other containers that is adapted to be readily inserted in a drum or barrel bushing and can either be locked in position for storage and shipping, or can selectively receive a demountable spigot for draining the contents of the container.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A cap and spigot assembly for a container having a depressed end head carrying a bung bushing which comprises a ring adapted to be sealingly seated in said bung bushing, a valve pivotally mounted on the inner face of said ring, a spring urging said valve against said end face of the ring to close the passage through the ring, a cap member spanning the outer portion of said passage through the ring, a screw carried by said cap acting on said valve to draw the valve toward the cap for locking the valve on the ring, and a sealing cap for the entire assembly locked on the bung bushing, said entire assembly terminating within the recess afforded by the depressed end head.

2. A drum cap and spigot assembly for bung bushing-equipped containers which comprises a ring adapted to be secured in a bung bushing, lugs on the inner face of said ring, a disk valve coacting with the inner face of said ring to close the passage through the ring, ears on said disk valve, a pin carried by said lugs and extending through said ears for pivotally supporting the disk valve on the ring, a torsion spring having coils around said pin and a finger acting on the inner face of said valve to urge the valve against the ring, a hollow drain spigot having an end slidably mounted in said ring, a seal ring carried by said spigot engaging said ring to seal the spigot end in the ring, a shoulder on said spigot adapted to engage the outer face of said ring for limiting the amount of insertion of the spring into the ring, and an end abutment face on said spigot for coacting with the outer face of said valve to swing the valve into opened position, said abutment face of the spigot and said outer face of the valve being constructed and arranged to establish initial contact between the valve and spigot at a point remote from the pivot pin and to transfer the point of initial contact to a point adjacent the pivot pin as the spigot is moved into the ring thereby effecting cracking of the valve off its seat under maximum leverage conditions followed by decreased leverage conditions which increase the degree of opening of the valve in relation to the degree of shifting of the spigot.

3. A drum cap and drain spigot assembly for bung bushing-equipped containers which comprises a drain ring adapted to be sealingly engaged in the bung bushing, a spring loaded valve pivotally mounted on the inner face of said ring for closing the passage through the ring, a hollow spigot slidably mounted in the ring, a coil spring carried by the spigot having an end coil adapted to be mounted on the bung bushing, said spring holding said spigot in the ring in a position permitting closure of the valve but accommodating shifting of the spigot into the ring for opening the valve, and said spigot and valve having abutment faces constructed and arranged to contact at different portions thereof as the spigot is depressed into the ring for changing the leverage applied to the valve during the course of opening the valve.

4. A cap and spigot assembly for an internally threaded bung bushing which comprises an externally threaded ring adapted to be threaded into the bushing and forming a flow passage through said bushing, said ring having an external flange at one end and a valve seat at the other end, a disk valve pivoted on the ring, a torsion spring normally urging said valve against said seat to close said flow passage, said flange terminating inwardly from the periphery of the bung bushing and adapted to be bottomed on the bung bushing, a removable cap spanning the outer end of said flow passage and a screw carried by said cap threadedly engageable with said valve to pivotally draw said valve toward the cap for locking said valve in closed position.

5. A cap and spigot assembly comprising a ring adapted to be mounted in the drain port of a container and forming a flow passage through the drain port, a normally closed valve seated on the inner face of said ring to control the flow of fluid through said flow passage, a spigot slidably inserted for adjusted axial movement in said flow passage, and a resilient spring connected to said spigot normally urging said spigot to a predetermined axial position out of engagement with said valve, said spigot being axially adjustable in said flow passage against the bias of said resilient spring to selectively engage and open said valve.

6. A cap and spigot assembly for a container of the type having a bung bushing, comprising, a ring adapted to be mounted in the bung bushing and forming a flow passage therethrough, a normally closed valve seated on the inner face of said ring to control the flow of fluid through said flow passage, a spigot slidably inserted for axially adjusted movement in said passage, a resilient spring connected to said spigot normally urging said spigot to a predetermined axial position in said flow passage, sealing means between said spigot and said ring to seal said spigot in said flow passage whenever said valve is open, said spigot being axially adjustable in said flow passage against the bias of said spring to engage and selectively open said valve.

7. A cap and spigot assembly for a container of the type having a bung bushing therein comprising a ring adapted to be mounted in the bung bushing and forming a flow passage therethrough, a valve seated on the inner face of said ring to control the flow of fluid through said passage, spring means normally biasing said valve into closed position, a spigot slidably inserted for axially adjusted movement in said flow passage, and a resilient spring connected to said spigot normally urging said spigot to a predetermined axial position out of engagement with said valve, said spigot being axially adjustable in said flow passage against the bias of said spring to engage and selectively open said valve against the bias of said spring means.

8. A drum cap and spigot assembly for bung-equipped containers which comprises a ring adapted to be mounted in the bung bushing of a container and forming a flow passage through said bung bushing, said ring having parallel flat opposed faces, the innermost face of said ring forming a valve seat and the outermost face of said ring comprising an outturned flange adapted to lie flush against the bung bushing, a disk valve pivotally mounted on the inner face of said ring, a torsion spring normally urging said disk valve against said seat to close said flow passage, a hollow spigot slidably inserted into said flow passage, a seal ring carried by said spigot and engageable with said ring, and a spring connected to said spigot normally positioning said spigot at a predetermined axial position in said flow passage, said spigot being axially positionable in said flow passage against the bias of said spring to selectively open said valve.

9. In a cap and spigot assembly, a ring adapted to be mounted in the bung of a container and having a flow passage therethrough, a valve mounted on said ring and being seated on one end of said ring to selectively close said flow passage, a removable cap member spanning the other end of said ring, and a fastener carried by said cap member and engageable with said valve to draw said valve and said cap member into locked-together assembly with said ring.

JACOB RUSH SNYDER.

REFERENCES CITED

The following references are of record in the file of this patent:

UNITED STATES PATENTS

| Number | Name | Date |
|---|---|---|
| 1,334,819 | Thorpe | Mar. 23, 1920 |
| 1,663,952 | Peaden | Mar. 27, 1928 |
| 2,267,754 | Schroeder | Dec. 30, 1941 |

FOREIGN PATENTS

| Number | Country | Date |
|---|---|---|
| 19,500 | Great Britain | Sept. 3, 1896 |
| 438,467 | Great Britain | Nov. 18, 1935 |
| 562,778 | France | Sept. 14, 1923 |